3,413,881
MACHINE FOR SAWING WORKPIECES OF LARGE DIMENSION HAVING TWO CIRCULAR SAW BLADES

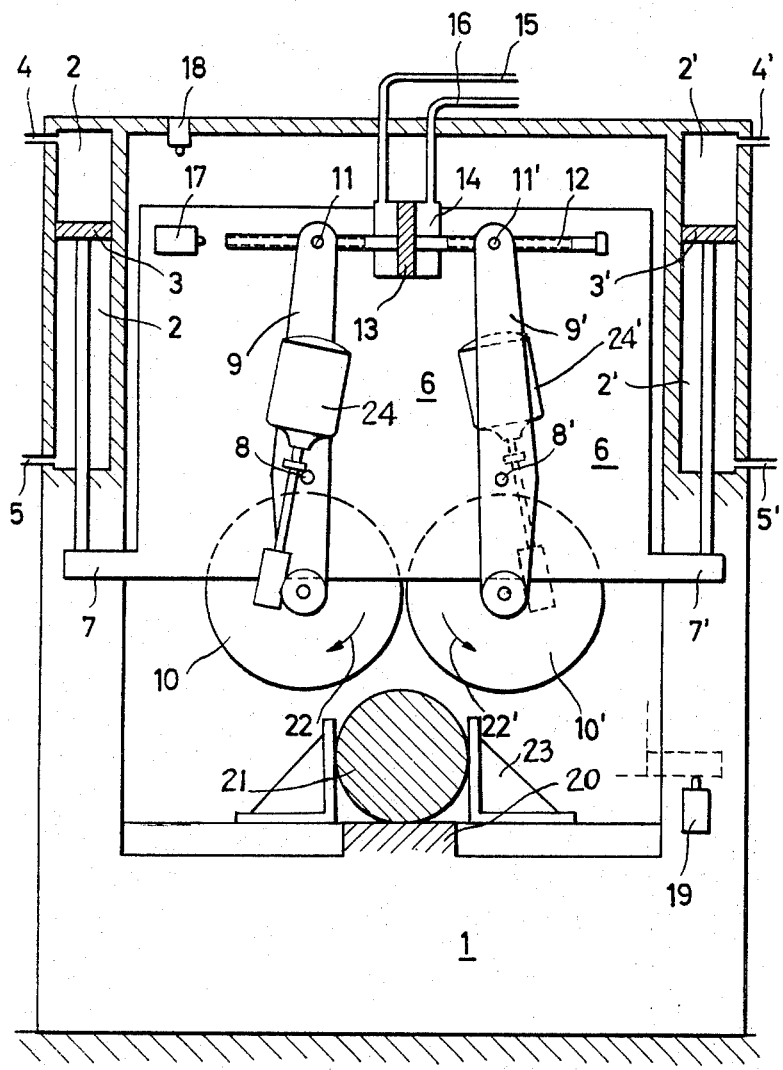

Paul Stolzer, Achern, Baden, Germany, assignor to Keuro Maschinenbau G.m.b.H. & Co. K.G., Achern, Baden, Germany
Filed Oct. 14, 1966, Ser. No. 586,720
Claims priority, application Germany, Oct. 14, 1965, K 57,390
7 Claims. (Cl. 83—486)

ABSTRACT OF THE DISCLOSURE

For cutting workpieces of large dimension, two circular saw blades with the driving means mounted a short distance from each other on a slideable carriage which is vertically moveable by hydraulic jacks towards and from the workpiece. The saw blades are further mounted for movement in a horizontal direction.

---

The present invention relates to a circular sawing machine which is designed primarily for cutting apart metallic workpieces of a large cross section by means of a pair of circular saw blades which operate simultaneously within the same plane.

The machines of this type are generally designated so that the two circular saw blades will cut from opposite sides into the workpiece. Since in the operation of such a machine the two saw blades should never touch each other, it is unavoidable that the two adjacent parts of the workpiece which are to be severed will remain connected to each other by two opposite sector-shaped pieces which are connected by a bridge at the center of the workpiece. For also cutting through these connecting parts, some of these machines have been designed so as either to rotate the workpiece while being cut or to rotate the two circular saw blades about the workpiece. However, the construction and operation of such machines is economical only if they are designed and used for merely sawing through workpieces of smaller cross-sectional dimensions inasmuch as the structures for rotatably mounting and driving such a large and heavy workpiece or for mounting the two saw blades so as to be rotatable about the axis of the workpiece would render such a machine extremely large and expensive. This is true especially if the workpieces to be severed consist of materials which are difficult to cut.

It is an object of the present invention to provide a circular sawing machine which overcomes the above-mentioned disadvantages of machines of this type as were previously designed and which is especially adapted for cutting apart workpieces of metal or other materials of large cross-sectional dimensions by the simultaneous operation of two circular saw blades which are disposed within the same plane. More particularly it is an object of the invention to provide a sawing machine of the mentioned type which has among others the advantages over the known machines of being of a more simple and more compact design, or requiring a much lower cost of production, and of being more economical in operation.

According to the invention, these objects are attained by mounting the two circular saw blades together with their driving means at a short distance from each other and at the same level on a slide carriage which is disposed within a machine frame or housing above the workpiece to be cut and is movable in a vertical direction by means of hydraulic units for moving the saw blades downwardly so as to cut through the stationary workpiece at substantially equal distances from a substantially central vertical plane of the latter, hereafter called the normal plane, and by providing a suitable control device for shifting the saw blades and their bearing and driving means after the completion of this first cut in a horizontal direction for a distance which is at least equal to the distance between the circular blades toward one side of their normal plane so that during the following upward movement of the slide carriage, one of the saw blades will cut through the connecting web which remained after the first cut between the two adjacent parts of the workpiece and will thus sever these two parts completely and with a clean cut from each other. Subsequently, the mentioned control device is again operated so as to return the saw blades and their bearing and driving means to their original position, that is, to their normal plane, so as to be ready for carrying out the next cutting operation on this or another workpiece.

If the machine according to the invention is designed and controlled in this manner, the two circular saw blades which are spaced at a short distance from each other will first cut through the workpiece in a downward direction at a substantially uniform cutting pressure under the action of the hydraulic units upon the slide carriage which carries the saw blades and their bearing and driving means. The narrow web which still connects the two adjacent parts of the workpiece at the completion of this first cut because of the distance between the two blades is thereafter completely cut by the return movement of the slide carriage and the saw blades thereon in the upward direction after the saw blades and their bearing and driving means have been shifted laterally by the control device at least for a distance equal to the distance between the blades. Consequently, during this return movement of the slide carriage by means of the hydraulic units, only one of the saw blades will cut with a small effort completely through the narrow remaining web. Of course, the operation of the control device of shifting the saw blades together with their bearing and driving means in the lateral direction for the short distance as required for cutting through the remaining web may also be combined with the return movement of the slide carriage and the saw blades in the upward direction rather than by a separate movement of the saw blades in a horizontal direction at the end of the first cutting operation.

The sawing machine according to the invention has the particular advantage that it permits the operation of cutting through the remaining web between the two adjacent parts of the workpiece to be carried out very easily and with a relatively small amount of energy, that the bearing means for the saw blades may be of a very simple construction and be produced at a relatively low cost, and that the entire machine may be built of a very compact size.

Another preferred feature of the invention consists in mounting each of the circular saw blades on one end of a rocker arm which is pivotable within a plane parallel to the common plane of the saw blades about a pivot which is mounted on the slide carriage at a point slightly above the saw blade. At their other end, the two rocker arms are pivotably mounted on nut members on the opposite sides of a spindle which are provided with right and left-hand threads, respectively, so as to permit the saw blades to be adjusted to the most desirable distance from each other, and the spindle is connected to the control device so as to be shifted horizontally in its longitudinal direction. The two circular saw blades are pivotably mounted on the slide carriage in such a position that their adjustment to the most suitable distance from each other, which may become necessary, for example, after the saw blades have been reground or when a new pair of saw blades has been installed, may be carried out without any difficulty, although they together with their driving means are mounted on the slide carriage so securely as to be properly supported on and guided by the latter. This pivotal arrangement of the saw blades has the further advantage that the entire control mechanism requires such a small space that the outer dimensions of the machine will thereby be hardly increased. The control device itself is preferably provided in the form of a hydraulic cylinder, the piston of which may be acted upon from both sides and is movable from one point in which it holds the saw blades within the above-mentioned normal plane to another point in which the saw blades are shifted horizontally from this plane at least for a distance equal to their distance from each other. The control device may also be designed in such a manner that the position of the saw blades within the normal plane will be attained by exerting a constant pressure upon one side of the piston and the same pressure upon the other side, while for moving the piston so as to shift the saw blades to the other position, a higher pressure is exerted upon the other side of the piston so as to overcome the constant pressure on the first side. Both positions of the saw blades are thus definitely determined and may be combined with the respective vertical movement of the slide carriage. This vertical movement of the slide carriage is preferably produced by similar hydraulic means in which at least one piston is acted upon at both sides and one side is acted upon by a constant pressure and the other side is at first acted upon by the same pressure and thereafter by a higher pressure so as to effect the movement of the piston in one direction. The end position of the slide carriage and also the end position of the control device may be determined by limit switches which preferably are of an electro-hydraulic type.

In order to prevent the saw blades from being damaged, especially because of mistakes in adjustment, it is advisable to drive them in opposite directions. This also substantially prevents the occurrence of a torque which has the tendency of turning the workpiece during the main cutting operation, whereas the torques which are exerted upon a symmetrical workpiece when the saw blades are driven in opposite directions will eliminate each other entirely, while the torques which might then be exerted upon an unsymmetrical workpiece will only differ slightly from each other and compensate each other to a large extent.

The features and advantages of the present invention will become more clearly apparent from the following detailed description thereof which is to be read with reference to the accompanying drawing in which a preferred embodiment of the invention is illustrated diagrammatically and partly in setcion.

The sawing machine according to the invention as illustrated in this drawing comprises a machine frame or housing 1 which contains two hydraulic cylinders 2 and 2' in which pistons 3 and 3' may be acted upon from either or both sides by a hydraulic fluid which is inserted through the inlet conduits 4, 4' and 5, 5'. The piston rods of pistons 3 and 3' are secured by arms 7 and 7' to a slide carriage 6 which is guided within the frame or housing 1 so as to be movable vertically either upwardly or downwardly depending upon which side of pistons 3 and 3' the greater pressure is exerted. On pivots 8 and 8' which are secured to slide carriage 6 two rocker arms 9 and 9' are pivotably mounted, the lower ends of which carry circular saw blades 10 and 10' together with their driving means. The upper ends of rocker arms 9 and 9' are pivotably connected at 11 and 11' to nut members, not shown, into which a spindle 12 is screwed which is provided with right and left-hand threads on its opposite sides. At its center, spindle 12 is connected to a piston 13 which serves as a control device and is movable back and forth within a hydraulic cylinder 14 on slide carriage 6 by a hydraulic fluid which may be conducted into the cylinder through inlet conduits 15 and 16 so as to act upon either or both sides of piston 13. Coaxially to spindle 12 and at a suitable distance from one of its ends a limit switch 17 is mounted on slide carriage 6 and adapted by suitable electro-hydraulic means to control the supply of pressure fluid through the inlet conduits 15 and 16 to cylinder 14. Similar limit switches 18 and 19 are mounted on the machine frame 1 for varying the supply of hydraulic fluid through the inlet conduits 4, 4' and 5, 5' to the cylinders 2 and 2' when slide carriage 6 reaches one or the other of its end positions. Underneath the saw blades 10 and 10' a support 20 is provided which is secured to the machine frame 1 and adapted to support the workpiece 21 to be cut which is pressed or clamped upon this support in a conventional manner as by clamps 23.

By turning the spindle 12, the two saw blades 10 and 10' may be adjusted so as to be spaced from each other at a very short distance of, for example, 1 mm. When the saw blades are thus adjusted, spindle 12 is locked in a fixed position and no longer needs to be turned again until the saw blades are reground or saw blades of a different diameter are to be mounted on the machine.

When the operation of the circular sawing machine according to the invention is to be started, the hydraulic cylinders 2, 2', and 14 are supplied through the conduits 5, 5', and 15 with hydraulic fluid under constant pressure by means of geared pumps and subsequent relief valves, not shown, which are adjusted to operate at a certain pressure. Since the conduits 4 and 4' leading to the cylinders 2 and 2' and conduit 16 leading to cylinder 14 are as yet not under pressure, slide carriage 6 will be moved by the constant pressure upwardly to its end position, that it, until it engages upon and actuates the electro-hydraulic limit switch 18, while piston 13 on spindle 12 is moved toward one side of cylinder 14, that is, toward the right of the drawing. By this movement of spindle 12, the saw blades 10 and 10' are shifted horizontally above the workpiece toward the left of the drawing for a distance which is larger than the preset distance between the two saw blades.

After the motors 24, 24' of the saw blades 10 and 10' have been switched on, the cutting operation is started by conventional electro-hydraulic control means, whereby a higher pressure is exerted through conduits 4 and 4' upon the upper sides of pistons 3 and 3' than through the conduits 5 and 5' upon their lower sides. This permits a very sensitive control of the downward movement of slide carriage 6 toward the workpiece 21 during which the saw blades 10 and 10' will cut through the workpiece with a constant cutting pressure. As soon as the saw blades have cut through the material, the arm 7' of slide carriage 6 will abut against and act upon the limit switch 19 which by conventional electro-hydraulic control means will then cause the supply of hydraulic fluid through conduit 16 to the cylinder 14. This hydraulic fluid is supplied to cylinder 14 under a higher pressure than the constant pressure of the fluid which is passed through conduit 15 and therefore shifts the piston 13 toward the left of the drawing to its opposite end position. At the same time, the two saw blades 10 and 10' are shifted by the pivoting movement of the rocker arms 9 and 9' in the horizontal direction toward the right of the drawing, whereby the saw blade 10 will cut through the lower end of the web which remained between the two parts of the workpiece at the end of the downward movement of slide carriage 6. When this horizontal movement of the saw blades on spindle 12 is completed, the latter will act upon the electro-hydraulic limit switch 17 which will then cause the flow of hydraulic fluid through the conduits 4 and 4' to the hydraulic cylinder 2 to be shut off so that only the constant pressure will then act upon the pistons 3 and 3' which is supplied through the conduits 5 and 5'. Slide carriage 6 and thus also the saw blades 10 and 10' will thereby again be moved upwardly so that the remainder of the connecting web between the two adjacent parts of the workpiece will be cut through entirely by saw blade 10. After slide carriage 6 has been shifted upwardly by the pressure which is supplied through the conduits 5 and 5' until it acts upon the electro-hydraulic limit switch 18, the latter will terminate the sawing operation by causing the supply of hydraulic fluid through conduit 16 to cylinder 14 to be shut off. However, since the constant pressure which is supplied through the conduit 15 still acts upon piston 13 in cylinder 14, spindle 12 and thus also the saw blades 10 and 10' will be moved toward the right of the drawing to their original position.

Any serious damage to the two circular saw blades 10 and 10' which might be due to an improper adjustment of spindle 12 will be prevented by driving them in opposite directions, as indicated by the arrows 22 and 22'. This has also the advantage that the torques which are exerted by the saw blades 10 and 10' upon the workpiece 21 will substantially eliminate each other and that, especially when the web is being cut through during the upward movement of slide carriage 6, no damage can occur by cut material which might fall between the two saw blades.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A sawing machine for cutting apart workpieces of large cross-sectional dimensions comprising a frame, means for securing a workpiece in a fixed position on said frame, a slide carriage movable within said frame, hydraulic means mounted on said frame for moving said slide carriage downwardly and upwardly, a pair of circular saw blades, means for mounting said saw blades on said slide carriage so as to be disposed within the same vertical plane and spaced at a small distance from each other for cutting said workpiece simultaneously during the downward movement of said slide carriage by said hydraulic means so that at the end of said downward movement the two adjacent parts of said workpiece between which the cut has been made remain connected to each other by a narrow web, driving means for rotating said saw blades, means for shifting said saw blades near the end of said downward movement in a lateral direction for a distance at least equal to the distance between said saw blades for cutting said connecting web by means of one of said saw blades and for thus severing said two parts completely from each other during the upward movement of said slide carriage by said hydraulic means, and control means for said hydraulic means and said shifting means for reversing the direction of movement of said slide carriage at least near the end of its downward stroke and for controlling the movement of said shifting means.

2. A sawing machine as defined in claim 1, in which said mounting means comprise a pair of rocker arms, means for pivotably connecting said rocker arms at corresponding points between their ends and at substantially the same level to said slide carriage, means for rotatably mounting each saw blade on the lower end of one of said rocker arms, and means for connecting the upper ends of said rocker arms to said shifting means so that both rocker arms will be simultaneously pivoted by the movements of said shifting means.

3. A sawing machine as defined in claim 2, in which said last connecting means comprise means for adjusting the distance between said upper ends of said rocker arms and for thereby varying the distance between said saw blades on the lower ends of said rocker arms.

4. A sawing machine as defined in claim 2, in which said last connecting means comprise a spindle for adjusting the distance between said saw blades, said spindle being rotatably mounted in a substantially horizontal position on said slide carriage and having right and left-hand threads on the opposite sides thereof, a nut member on each of said sides of said spindle, means for pivotably connecting the upper end of each rocker arm to one of said nut members, and means for connecting said spindle to said shifting means.

5. A sawing machine as defined in claim 2, in which said shifting means comprise at least one hydraulic cylinder and piston unit pivotably connected to the upper ends of said rocker arms for pivoting said arms equally and simultaneously in the same direction.

6. A sawing machine as defined in claim 4, in which said shifting means comprise a hydraulic unit having a cylinder and a piston slidable back and forth in a substantially horizontal direction within said cylinder and having a piston rod on each side thereof forming said spindle, said control means comprising electro-hydraulic limit switches, a first of said switches mounted on said frame and adapted to be acted upon by said slide carriage near the end of its downward stroke so as to terminate said stroke and to actuate said hydraulic unit so as to move said piston and spindle longitudinally in one direction, a second switch mounted on said slide carriage and adapted to be acted upon by said spindle at the end of said longitudinal movement so as to stop said movement and actuate said hydraulic means for moving said slide carriage upwardly to its original level, and a third switch mounted on said frame and adapted to be acted upon by said slide carriage near the end of its upward stroke for reversing the movement of said piston and spindle so as to shift said saw blades to their original position.

7. A sawing machine as defined in claim 1, in which said driving means are adapted to rotate said saw blades in opposite directions to each other.

References Cited

UNITED STATES PATENTS 2,243,303  5/1941  Wells _____ 83—488 X
2,722,731  11/1955  Tarte _____ 83—488

FOREIGN PATENTS 884,591  12/1961  Great Britain.

WILLIAM S. LAWSON, *Primary Examiner.*